E. M. FITZ.
STORAGE BATTERY SEPARATOR.
APPLICATION FILED FEB. 2, 1910.
963,284.
Patented July 5, 1910.
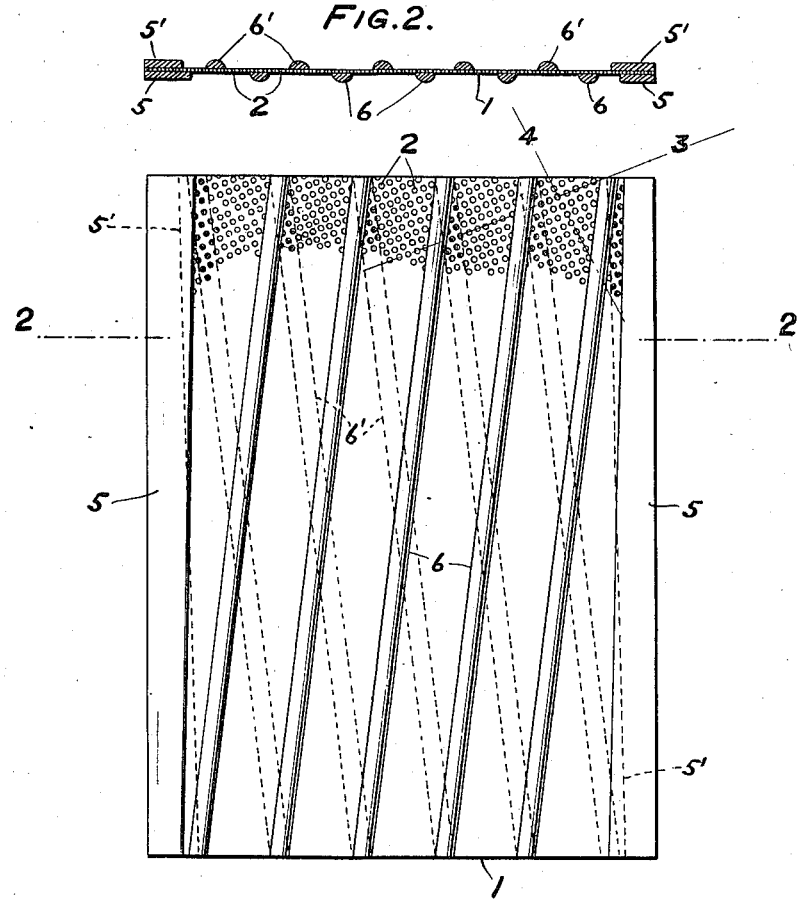
WITNESSES:
INVENTOR
Ervin M. Fitz
BY
Charles N. Butler
ATTORNEY.

UNITED STATES PATENT OFFICE.

ERVIN M. FITZ, OF COLUMBUS, OHIO.

STORAGE-BATTERY SEPARATOR.

963,284.

Specification of Letters Patent. Patented July 5, 1910.

Application filed February 2, 1910. Serial No. 541,426.

*To all whom it may concern:*

Be it known that I, ERVIN M. FITZ, a citizen of the United States, residing in the city of Columbus, county of Franklin, and State of Ohio, have invented an Improved Storage-Battery Separator, of which the following is a specification.

My invention is a storage battery separator designed to obviate the usual loss by breakage due to the frail perforated constructions and lines of weakness characteristic of separators heretofore used.

In the preferred form of my invention, a thin sheet of insulating material has the perforations therethrough arranged so that the weakened lines resulting therefrom shall extend diagonally to the edges of the plate and the opposite faces of the plate are provided with strengthening ribs transversely disposed to each other and to the lines of the perforations.

In the accompanying drawings, Figure 1 is a top plan view of a separator embodying my improvements; Fig. 2 is a sectional view taken on the line 2—2 of Fig. 3; and Fig. 3 is a side elevation of the same partially perforated.

The plate 1, suitably formed of rubber composition, is provided with the perforations 2 which lie in the transverse lines 3 and 4, each of these lines extending transversely to the edges of the plate, preferably at an angle of approximately twenty degrees with parallel edges. Outer ribs 5 and 5', tapered in opposite directions, are fixed on opposite sides of each vertical edge of the plate, the inclined inner edges of these ribs extending at an angle to each of the lines 3 and 4. Interior sets of ribs 6 and 6' are fixed respectively to the opposite faces of the plate, the ribs of each set being parallel to each other and transverse to the ribs of the other set as also to the lines of the perforations. Each interior rib has each of its ends disposed opposite to the end of a rib on the opposite side of the plate and the middle of each interior rib is disposed opposite to approximately the middle of a rib on the opposite side of the plate. There is thus formed a separator which is thoroughly braced, and the perforated plate comprised therein has all of its lines of least resistance interrupted at short intervals, it being impossible for it to crack throughout its vertical, horizontal or transverse length or any considerable part thereof without the crack being interrupted by a rib.

Having described my invention, I claim:

1. In a storage battery separator, the combination of a perforated sheet of insulating material, with a set of diagonal ribs on each side thereof, the ribs on the respective sides being transversely disposed to each other and to the lines of least resistance of the perforations of said sheet.

2. In a storage battery separator, the combination of a perforated plate of insulating material, with oppositely tapered ribs applied to each of the vertical edges thereof, and diagonal ribs extending transversely to said edges across each face of said plate, said diagonal ribs on the opposite sides of said plate extending transversely to each other so as to fully brace said plate.

In witness whereof I have hereunto set my name this 29th day of January, 1910, in the presence of the subscribing witnesses.

ERVIN M. FITZ.

Witnesses:
L. E. DILLON,
S. B. RANDALL.